United States Patent
Shaw

(10) Patent No.: US 9,514,113 B1
(45) Date of Patent: Dec. 6, 2016

(54) METHODS FOR AUTOMATIC FOOTNOTE GENERATION

(71) Applicant: Google Inc., Mountain View, CA (US)

(72) Inventor: Hayden Shaw, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 184 days.

(21) Appl. No.: 13/952,829

(22) Filed: Jul. 29, 2013

(51) Int. Cl.
*G06F 17/00* (2006.01)
*G06F 17/24* (2006.01)
*G06F 17/30* (2006.01)
*G06F 17/22* (2006.01)

(52) U.S. Cl.
CPC ......... *G06F 17/241* (2013.01); *G06F 17/2235* (2013.01); *G06F 17/24* (2013.01); *G06F 17/3053* (2013.01); *G06F 17/3089* (2013.01); *G06F 17/30613* (2013.01); *G06F 17/30864* (2013.01); *G06F 17/30867* (2013.01); *G06F 17/30882* (2013.01)

(58) Field of Classification Search
CPC ................. G06F 17/24; G06F 17/241; G06F 17/30864; G06F 17/30867; G06F 17/3089; G06F 17/30613; G06F 17/2235; G06F 17/3053; G06F 17/30882
USPC ....................................................... 715/205
See application file for complete search history.

(56) References Cited

U.S. PATENT DOCUMENTS

| | | | |
|---|---|---|---|
| 5,280,367 A | 1/1994 | Zuniga | |
| 5,448,695 A | 9/1995 | Douglas et al. | |
| 5,493,692 A | 2/1996 | Theimer et al. | |
| 5,544,049 A * | 8/1996 | Henderson et al. | 704/7 |
| 5,600,778 A | 2/1997 | Swanson et al. | |
| 5,613,163 A | 3/1997 | Marron et al. | |
| 5,721,849 A | 2/1998 | Amro | |
| 5,790,127 A | 8/1998 | Anderson et al. | |
| 5,821,928 A | 10/1998 | Melkus et al. | |
| 5,826,015 A | 10/1998 | Schmidt | |

(Continued)

FOREIGN PATENT DOCUMENTS

| | | |
|---|---|---|
| WO | WO2012057726 | 5/2012 |
| WO | WO2014072767 A1 | 5/2014 |

OTHER PUBLICATIONS

Ganguly et al. "Query Expansion for Language Modeling using Sentence Similarities", Jun. 2, 2011, CNGL, School of Computing, Dublin City University, Ireland, pp. 16.*

(Continued)

*Primary Examiner* — Chau Nguyen
(74) *Attorney, Agent, or Firm* — Young Basile Hanlon & MacFarlane, P.C.

(57) ABSTRACT

A method includes accessing a document and generating a ranking score for each of a plurality of passages from external documents. The ranking score is based at least on a degree of semantic similarity of each passage with respect to a portion of the document. The method also includes modifying the document to include a footnote link for the portion of the document, the footnote link including a link to the external document having the highest ranked passage therein, if the ranking score of the highest ranked passage with respect to the portion of the document exceeds a threshold value. The document is not modified to include the footnote link for the portion of the document if the ranking score of the highest ranked passage with respect to the portion of the document does not exceed a threshold value.

21 Claims, 4 Drawing Sheets

(56) References Cited

U.S. PATENT DOCUMENTS

| | | | |
|---|---|---|---|
| 5,845,300 A | 12/1998 | Comer et al. | |
| 5,859,640 A | 1/1999 | de Judicibus | |
| 5,877,763 A | 3/1999 | Berry et al. | |
| 5,883,626 A | 3/1999 | Glaser et al. | |
| 5,905,991 A | 5/1999 | Reynolds | |
| 5,966,121 A | 10/1999 | Hubbell et al. | |
| 6,005,575 A | 12/1999 | Colleran et al. | |
| 6,018,341 A | 1/2000 | Berry et al. | |
| 6,272,490 B1* | 8/2001 | Yamakita | |
| 6,295,542 B1* | 9/2001 | Corbin | 715/205 |
| 6,301,573 B1 | 10/2001 | McIlwaine et al. | |
| 6,377,965 B1 | 4/2002 | Hachamovitch et al. | |
| 6,421,678 B2 | 7/2002 | Smiga et al. | |
| 6,463,078 B1 | 10/2002 | Engstrom et al. | |
| 6,546,393 B1 | 4/2003 | Khan | |
| 6,564,213 B1 | 5/2003 | Ortega et al. | |
| 6,647,383 B1 | 11/2003 | August et al. | |
| 6,654,038 B1 | 11/2003 | Gajewska et al. | |
| 6,751,604 B2 | 6/2004 | Barney et al. | |
| 6,789,251 B1 | 9/2004 | Johnson | |
| 6,820,075 B2 | 11/2004 | Shanahan et al. | |
| 6,865,714 B1 | 3/2005 | Liu et al. | |
| 6,889,337 B1 | 5/2005 | Yee | |
| 6,907,447 B1 | 6/2005 | Cooperman et al. | |
| 6,980,977 B2 | 12/2005 | Hoshi et al. | |
| 7,003,506 B1 | 2/2006 | Fisk et al. | |
| 7,003,737 B2 | 2/2006 | Chiu et al. | |
| 7,031,963 B1 | 4/2006 | Bae | |
| 7,051,277 B2 | 5/2006 | Kephart et al. | |
| 7,073,129 B1 | 7/2006 | Robarts et al. | |
| 7,103,835 B1 | 9/2006 | Yankovich et al. | |
| 7,117,432 B1* | 10/2006 | Shanahan | G06F 17/218 715/236 |
| 7,127,674 B1 | 10/2006 | Carroll et al. | |
| 7,146,422 B1 | 12/2006 | Marlatt et al. | |
| 7,295,995 B1 | 11/2007 | York et al. | |
| 7,353,252 B1 | 4/2008 | Yang et al. | |
| 7,353,397 B1 | 4/2008 | Herbach | |
| 7,370,274 B1 | 5/2008 | Stuple et al. | |
| 7,380,218 B2 | 5/2008 | Rundell | |
| 7,386,789 B2 | 6/2008 | Chao et al. | |
| 7,392,249 B1 | 6/2008 | Harris et al. | |
| 7,395,507 B2 | 7/2008 | Robarts et al. | |
| 7,406,659 B2 | 7/2008 | Klein et al. | |
| 7,451,389 B2 | 11/2008 | Huynh et al. | |
| 7,480,715 B1 | 1/2009 | Barker et al. | |
| 7,487,145 B1 | 2/2009 | Gibbs et al. | |
| 7,493,560 B1* | 2/2009 | Kipnes | G06F 9/4446 715/205 |
| 7,499,919 B2 | 3/2009 | Meyerzon et al. | |
| 7,499,940 B1 | 3/2009 | Gibbs | |
| 7,647,312 B2 | 1/2010 | Dai | |
| 7,664,786 B2 | 2/2010 | Oh et al. | |
| 7,685,144 B1 | 3/2010 | Katragadda | |
| 7,685,516 B2 | 3/2010 | Fischer | |
| 7,716,236 B2 | 5/2010 | Sidhu et al. | |
| 7,734,627 B1 | 6/2010 | Tong | |
| 7,756,935 B2 | 7/2010 | Gaucas | |
| 7,761,788 B1 | 7/2010 | McKnight et al. | |
| 7,769,579 B2 | 8/2010 | Zhao et al. | |
| 7,774,328 B2 | 8/2010 | Hogue et al. | |
| 7,779,355 B1 | 8/2010 | Erol et al. | |
| 7,783,965 B1 | 8/2010 | Dowd et al. | |
| 7,818,678 B2 | 10/2010 | Massand | |
| 7,836,044 B2 | 11/2010 | Kamvar et al. | |
| 7,917,848 B2 | 3/2011 | Harmon et al. | |
| 8,020,003 B2 | 9/2011 | Fischer | |
| 8,020,112 B2 | 9/2011 | Ozzie et al. | |
| 8,027,974 B2 | 9/2011 | Gibbs | |
| 8,051,088 B1 | 11/2011 | Tibbetts et al. | |
| 8,086,960 B1 | 12/2011 | Gopalakrishna et al. | |
| 8,091,020 B2 | 1/2012 | Kuppusamy et al. | |
| 8,117,535 B2 | 2/2012 | Beyer et al. | |
| 8,185,448 B1 | 5/2012 | Myslinski | |
| 8,224,802 B2 | 7/2012 | Hogue et al. | |
| 8,229,795 B1 | 7/2012 | Myslinski | |
| 8,239,751 B1 | 8/2012 | Rochelle et al. | |
| 8,260,785 B2 | 9/2012 | Hogue et al. | |
| 8,261,192 B2 | 9/2012 | Djabarov | |
| 8,346,620 B2 | 1/2013 | King et al. | |
| 8,346,877 B2 | 1/2013 | Turner | |
| 8,359,550 B2 | 1/2013 | Meyer et al. | |
| 8,370,275 B2 | 2/2013 | Bhattacharya et al. | |
| 8,386,914 B2 | 2/2013 | Baluja et al. | |
| 8,434,134 B2 | 4/2013 | Khosrowshahi et al. | |
| 8,453,066 B2 | 5/2013 | Ozzie et al. | |
| 8,458,046 B2 | 6/2013 | Myslinski | |
| 8,572,388 B2 | 10/2013 | Boemker et al. | |
| 8,595,174 B2 | 11/2013 | Gao et al. | |
| 8,621,222 B1 | 12/2013 | Das | |
| 8,667,394 B1 | 3/2014 | Spencer | |
| 8,782,516 B1 | 7/2014 | Dozier | |
| 8,799,765 B1 | 8/2014 | MacInnis et al. | |
| 8,856,640 B1 | 10/2014 | Barr et al. | |
| 8,856,645 B2 | 10/2014 | Vandervort et al. | |
| 8,904,284 B2 | 12/2014 | Grant et al. | |
| 2001/0025287 A1 | 9/2001 | Okabe et al. | |
| 2002/0010725 A1 | 1/2002 | Mo | |
| 2002/0029337 A1 | 3/2002 | Sudia et al. | |
| 2002/0035714 A1 | 3/2002 | Kikuchi et al. | |
| 2002/0069223 A1 | 6/2002 | Goodisman et al. | |
| 2002/0070977 A1 | 6/2002 | Morcos et al. | |
| 2002/0103914 A1 | 8/2002 | Dutta et al. | |
| 2002/0129100 A1 | 9/2002 | Dutta et al. | |
| 2002/0152255 A1 | 10/2002 | Smith, Jr. et al. | |
| 2002/0161839 A1 | 10/2002 | Colasurdo et al. | |
| 2002/0187815 A1 | 12/2002 | Deeds et al. | |
| 2003/0046263 A1* | 3/2003 | Castellanos et al. | 707/1 |
| 2003/0058286 A1 | 3/2003 | Dando | |
| 2003/0061200 A1* | 3/2003 | Hubert | G06F 17/30011 |
| 2003/0069877 A1 | 4/2003 | Grefenstette et al. | |
| 2003/0156130 A1 | 8/2003 | James et al. | |
| 2003/0172353 A1 | 9/2003 | Cragun | |
| 2003/0200192 A1 | 10/2003 | Bell et al. | |
| 2003/0234822 A1 | 12/2003 | Spisak | |
| 2004/0061716 A1 | 4/2004 | Cheung et al. | |
| 2004/0062213 A1 | 4/2004 | Koss | |
| 2004/0122846 A1 | 6/2004 | Chess et al. | |
| 2004/0139465 A1 | 7/2004 | Matthews, III et al. | |
| 2004/0140901 A1 | 7/2004 | Marsh | |
| 2004/0145607 A1 | 7/2004 | Alderson | |
| 2004/0153973 A1 | 8/2004 | Horwitz | |
| 2004/0164991 A1 | 8/2004 | Rose | |
| 2004/0177319 A1* | 9/2004 | Horn | 715/501.1 |
| 2005/0024487 A1 | 2/2005 | Chen | |
| 2005/0028081 A1 | 2/2005 | Arcuri et al. | |
| 2005/0034060 A1 | 2/2005 | Kotler et al. | |
| 2005/0039191 A1 | 2/2005 | Hewson et al. | |
| 2005/0044132 A1 | 2/2005 | Campbell et al. | |
| 2005/0044369 A1 | 2/2005 | Anantharaman | |
| 2005/0055416 A1 | 3/2005 | Heikes et al. | |
| 2005/0120308 A1 | 6/2005 | Gibson et al. | |
| 2005/0144162 A1 | 6/2005 | Liang | |
| 2005/0144573 A1 | 6/2005 | Moody et al. | |
| 2005/0160065 A1 | 7/2005 | Seeman | |
| 2005/0183001 A1 | 8/2005 | Carter et al. | |
| 2005/0183006 A1 | 8/2005 | Rivers-Moore et al. | |
| 2005/0198589 A1 | 9/2005 | Heikes et al. | |
| 2005/0210256 A1 | 9/2005 | Meier et al. | |
| 2005/0246653 A1 | 11/2005 | Gibson et al. | |
| 2006/0005142 A1 | 1/2006 | Karstens | |
| 2006/0010865 A1 | 1/2006 | Walker | |
| 2006/0041836 A1 | 2/2006 | Gordon et al. | |
| 2006/0047682 A1 | 3/2006 | Black et al. | |
| 2006/0080303 A1 | 4/2006 | Sargent et al. | |
| 2006/0106778 A1 | 5/2006 | Baldwin | |
| 2006/0136552 A1 | 6/2006 | Krane et al. | |
| 2006/0150087 A1 | 7/2006 | Cronenberger et al. | |
| 2006/0190435 A1 | 8/2006 | Heidloff et al. | |
| 2006/0213993 A1 | 9/2006 | Tomita | |
| 2006/0248070 A1 | 11/2006 | Dejean et al. | |
| 2007/0005581 A1 | 1/2007 | Arrouye et al. | |
| 2007/0005697 A1 | 1/2007 | Yuan et al. | |
| 2007/0033200 A1 | 2/2007 | Gillespie | |

(56) References Cited

U.S. PATENT DOCUMENTS

| | | |
|---|---|---|
| 2007/0143317 A1 | 6/2007 | Hogue et al. |
| 2007/0150800 A1 | 6/2007 | Betz et al. |
| 2007/0156761 A1 | 7/2007 | Smith |
| 2007/0162907 A1 | 7/2007 | Herlocker et al. |
| 2007/0168355 A1 | 7/2007 | Dozier et al. |
| 2007/0198952 A1 | 8/2007 | Pittenger |
| 2007/0220259 A1 | 9/2007 | Pavlicic |
| 2007/0280205 A1* | 12/2007 | Howell et al. ............... 370/352 |
| 2007/0291297 A1 | 12/2007 | Harmon et al. |
| 2007/0294610 A1* | 12/2007 | Ching ............... G06F 17/30014 |
| 2008/0022107 A1 | 1/2008 | Pickles et al. |
| 2008/0028284 A1 | 1/2008 | Chen |
| 2008/0034213 A1 | 2/2008 | Boemker et al. |
| 2008/0059539 A1 | 3/2008 | Chin et al. |
| 2008/0077571 A1 | 3/2008 | Harris et al. |
| 2008/0082907 A1 | 4/2008 | Sorotokin et al. |
| 2008/0120319 A1 | 5/2008 | Drews et al. |
| 2008/0172608 A1 | 7/2008 | Patrawala et al. |
| 2008/0208969 A1 | 8/2008 | Van Riel |
| 2008/0239413 A1 | 10/2008 | Vuong et al. |
| 2008/0320397 A1 | 12/2008 | Do et al. |
| 2009/0006936 A1 | 1/2009 | Parker et al. |
| 2009/0013244 A1 | 1/2009 | Cudich et al. |
| 2009/0044143 A1 | 2/2009 | Karstens |
| 2009/0044146 A1 | 2/2009 | Patel et al. |
| 2009/0083245 A1 | 3/2009 | Ayotte et al. |
| 2009/0094178 A1 | 4/2009 | Aoki |
| 2009/0132560 A1 | 5/2009 | Vignet |
| 2009/0192845 A1 | 7/2009 | Gudipaty et al. |
| 2009/0198670 A1 | 8/2009 | Shiffer et al. |
| 2009/0204818 A1 | 8/2009 | Shin et al. |
| 2009/0282144 A1 | 11/2009 | Sherrets et al. |
| 2009/0292673 A1* | 11/2009 | Carroll ............... 707/3 |
| 2010/0070448 A1 | 3/2010 | Omoigui |
| 2010/0070881 A1 | 3/2010 | Hanson et al. |
| 2010/0076946 A1 | 3/2010 | Barker et al. |
| 2010/0100743 A1 | 4/2010 | Ali et al. |
| 2010/0121888 A1* | 5/2010 | Cutting et al. ............... 707/803 |
| 2010/0131523 A1 | 5/2010 | Yu et al. |
| 2010/0180200 A1 | 7/2010 | Donneau-Golencer et al. |
| 2010/0191744 A1 | 7/2010 | Meyerzon et al. |
| 2010/0198821 A1* | 8/2010 | Loritz et al. ............... 707/728 |
| 2010/0223541 A1 | 9/2010 | Clee et al. |
| 2010/0251086 A1 | 9/2010 | Haumont et al. |
| 2010/0268700 A1 | 10/2010 | Wissner et al. |
| 2010/0269035 A1 | 10/2010 | Meyer et al. |
| 2010/0275109 A1 | 10/2010 | Morrill |
| 2010/0281353 A1 | 11/2010 | Rubin |
| 2011/0016106 A1 | 1/2011 | Xia |
| 2011/0023022 A1 | 1/2011 | Harper et al. |
| 2011/0043652 A1 | 2/2011 | King et al. |
| 2011/0060584 A1 | 3/2011 | Ferrucci et al. |
| 2011/0072338 A1 | 3/2011 | Caldwell |
| 2011/0082876 A1 | 4/2011 | Lu et al. |
| 2011/0087973 A1 | 4/2011 | Martin et al. |
| 2011/0126093 A1 | 5/2011 | Ozzie et al. |
| 2011/0173210 A1 | 7/2011 | Ahn et al. |
| 2011/0179378 A1 | 7/2011 | Wheeler et al. |
| 2011/0191276 A1 | 8/2011 | Cafarella et al. |
| 2011/0209064 A1* | 8/2011 | Jorgensen et al. ............... 715/733 |
| 2011/0209075 A1 | 8/2011 | Wan |
| 2011/0219291 A1 | 9/2011 | Lisa |
| 2011/0225482 A1 | 9/2011 | Chan et al. |
| 2011/0225490 A1 | 9/2011 | Meunier |
| 2011/0252312 A1 | 10/2011 | Lemonik et al. |
| 2011/0276538 A1 | 11/2011 | Knapp et al. |
| 2011/0296291 A1 | 12/2011 | Melkinov et al. |
| 2011/0306028 A1 | 12/2011 | Galimore |
| 2012/0078826 A1 | 3/2012 | Ferrucci et al. |
| 2012/0084644 A1 | 4/2012 | Robert et al. |
| 2012/0095979 A1 | 4/2012 | Aftab et al. |
| 2012/0116812 A1 | 5/2012 | Boone et al. |
| 2012/0124053 A1 | 5/2012 | Ritchford et al. |
| 2012/0166924 A1 | 6/2012 | Larson et al. |
| 2012/0173960 A1* | 7/2012 | Bennett ............... G06F 17/217 715/234 |
| 2012/0185473 A1 | 7/2012 | Ponting et al. |
| 2012/0203734 A1 | 8/2012 | Spivack et al. |
| 2012/0226646 A1 | 9/2012 | Donoho et al. |
| 2012/0233152 A1* | 9/2012 | Vanderwende ... G06F 17/30728 707/722 |
| 2012/0254730 A1 | 10/2012 | Sunderland et al. |
| 2012/0284602 A1 | 11/2012 | Seed et al. |
| 2012/0304046 A1 | 11/2012 | Neill et al. |
| 2012/0317046 A1 | 12/2012 | Myslinski |
| 2013/0036344 A1 | 2/2013 | Ahmed et al. |
| 2013/0041685 A1 | 2/2013 | Yegnanarayanan |
| 2013/0132566 A1 | 5/2013 | Olsen et al. |
| 2013/0165086 A1 | 6/2013 | Doulton |
| 2013/0212062 A1 | 8/2013 | Levy et al. |
| 2013/0246346 A1 | 9/2013 | Khosrowshahi et al. |
| 2013/0268830 A1 | 10/2013 | Khosrowshahi et al. |
| 2014/0013197 A1 | 1/2014 | McAfee et al. |
| 2014/0032913 A1 | 1/2014 | Tenenboym et al. |
| 2014/0040249 A1 | 2/2014 | Ploesser et al. |
| 2014/0236958 A1 | 8/2014 | Vaughn |
| 2015/0012805 A1 | 1/2015 | Bleiweiss et al. |

OTHER PUBLICATIONS

Missen et al., "Comparing Semantic Associations in Sentences and Paragraphs for Opinion Detection in Blogs", Medes 2009, Oct. 27-30, 2009, Lyon, France, Copyright 2008 ACM, pp. 6.*
Bollegala et al., "Measuring Semantic Similarity between Words Using Web Search Engines", May 8-12, 2007, Banff, Alberta, Canada, ACM 978, pp. 10.*
"Bohman, P. ""Introduction to Web Accessibility"", Oct. 2003, ebAIM, printed Apr. 17, 2004,<http://www.webaim.org/intro/?templatetype=3> (p. 1-6)".
"Caldwell et al., ""Web Content Accessibility Guidelines 2.0, W3C Working Draft Mar. 11, 2004""", Mar. 11, 2004, WorldWide Web Consortium (p. 1-56)".
Francik, E., Computer-& screen -based interfaces: Universal design filter, Human Factors Engineering, Pacific Bell Version 2, Jun. 6, 1996.
Griesser, A., "A generic editor Full text," pp. 50-55, 1997 ACM Press NewYork, NY, USA.
Jacobs, Ian, et al., "User Agent Accessibility Guidelines 1.0, W3C Recommendation Dec. 17, 2002", World Wide Web Consortium, 115 pages.
Treviranus, Jutta, et al., "Authoring Tool Accessibility Guidelines 1.0, W3C Recommendation Feb. 3, 2000", World Wide Web Consortium (p. 1-22).
Ashman. "Electronic Document Addressing: Dealing with Change." ACM Computing Surveys, vol. 32, No. 3, Sep. 2000, pp. 201-212.
ISR and Written Opinion of the International Searching Authority in PCT Application No. PCT/US2011/037862, dated Oct. 31, 2011, 64 pages.
Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.
Fox. "Maps API Blog: Creating Dynamic Client-side Maps Mashups with Google Spreadsheets." Mar. 2007, [retrieved on Dec. 5, 2011]. Retrieved from the Internet: <URL:http://googlemapsapi.blogspot.com/2007/03/creating-dynamic-client-side-maps.html>. 2 pages.
GeekRant.org' [online]. "How to Embed a Word Document in Another Word Document," Sep. 14, 2005, [retrieved on Dec. 5, 2011]. Retrieved from the Internet: <URL:http://www.geekrant.org/2005/09/14/word-embed-document/>. 6 pages.
Herrick. "Google this Using Google Apps for Collaboration and Productivity." Proceedings of the ACM Siguccs Fall Conference on User Services Conference, Siguccs '09, Jan. 2009, p. 55.
https://en.wikipedia.org/wiki/Backus%E2%80%93Naur_Form, as of Jul. 14, 2013.
https://en.wikipedia.org/wiki/Regular_expression, as of Sep. 2, 2013.

(56) References Cited

OTHER PUBLICATIONS

Kappe. "Hyper-G: A Distributed Hypermedia System." Proceedings of the International Networking Conference, 1993, [retrieved on Oct. 20, 2011]. Retrieved from the Internet: <URL:http://ftp.iicm.tugraz.at/pub/papers/inet93.pdf>. 9 pages.

Kircher. "Lazy Acquisition." Proceedings of the 6th European Conference on Pattern Languages of Programs, Jul. 2011, pp. 1-11.

Microsoft Support' [online]. "How to Embed and Automate Office Documents with Visual Basic," Mar. 27, 2007, [retrieved on Dec. 5, 2011]. Retrieved from the Internet: <URLhttp://support.microsoft.com/kb/242243>. 6 pages.

Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.

Oracle Provider for OLE DB—Developer's Guide. 10g Release 1 (10.1) Dec. 2003, Oracle Corp., 90 pages.

Pinkas et al. "CMS Advanced Electrponic Signatures," Request for Comments 5126, Feb. 2008, 142 pages.

WebArchive' [online]. "Supplementary Notes for MFC Programming Module 23 and Module 27: Interfaces, com.com + and OLE" in: http://www.tenouk.com/visualcplusmfc/mfcsupp/ole.html, Jan. 6, 2008, [retrieved on Dec. 5, 2011]. Retrieved from the Internet: <URL:http://web.archive.org/web/20091125073542/http://www.tenouk.com/visualcplusmfc/mfcsupp/ole.html>. 4 pages.

Jourdan, Guy-Vincent, CSI 3140 WWW Structures, Techniques and Standards, Cascading Style Sheets, power point slides, published Feb. 16, 2010.

W3C, Cascading Style sheets Level 2 Revision 1 Specification, Apr. 15, 2011, 487 pages.

David Sawyer McFarland, "CSS the missing manual", O'Reilly, Aug. 2009, pp. 7-101, 134-138, 428-429.

Herb Tyson, Microsoft Word 2010 Bible, John Wiley & Sons, pp. 221, 757, 833, Jun. 21, 2010.

Timestamp from Wikipedia, accessed from https://en.wikipedialcorg/wiki/Timestamp, archived by WaybackMachine on Sep. 15, 2012, pp. 1-2.

\* cited by examiner

METHODS FOR AUTOMATIC FOOTNOTE GENERATION

BACKGROUND

The disclosure herein relates generally to modifying documents to include links to external information.

When reading a non-fiction document, a reader may often wonder about the reliability of statements made by an author. In formal writing, authors typically include footnotes that identify primary sources, such as research papers or books that provide support for statements of fact.

In many documents that are available via the internet, authors make statements of fact without identifying a source of reliable information that supports the statement. These documents include, for example, encyclopedia pages, blogs, news articles, advocacy group web pages, and responses on answer forums. Thus, readers are not provided with a convenient source of information with which to verify the statements made in the document.

SUMMARY

The disclosure relates to methods for automatic footnote generation.

One aspect of the disclosed embodiments is a method that includes accessing, at one or more computing devices, a document. The method also includes generating, using the one or more computing devices, a ranking score for each of a plurality of passages from external documents. The ranking score is based at least on a degree of semantic similarity of each passage with respect to a portion of the document. The method also includes modifying, using the one or more computing devices, the document to include a footnote link for the portion of the document, the footnote link including a link to the external document having the highest ranked passage therein, if the ranking score of the highest ranked passage with respect to the portion of the document exceeds a threshold value. The document is not modified to include the footnote link for the portion of the document if the ranking score of the highest ranked passage with respect to the portion of the document does not exceed a threshold value.

Another aspect of the disclosed embodiments is a non-transitory storage medium including program instructions executable by one or more processors that, when executed, cause the one or more processors to perform operations. The operations include accessing, at one or more computing devices, a document; generating, using the one or more computing devices, a ranking score for each of a plurality of passages from external documents, wherein the ranking score is based at least on a degree of semantic similarity of each passage with respect to a portion of the document; and modifying, using the one or more computing devices, the document to include a footnote link for the portion of the document, the footnote link including a link to the external document having the highest ranked passage therein, if the ranking score of the highest ranked passage with respect to the portion of the document exceeds a threshold value, wherein the document is not modified to include the footnote link for the portion of the document if the ranking score of the highest ranked passage with respect to the portion of the document does not exceed a threshold value.

Another aspect of the disclosed embodiments is an apparatus that includes one or more processors and one or more memory devices for storing program instructions used by the one or more processors. The program instructions, when executed by the one or more processors, cause the one or more processors to: access, at one or more computing devices, a document; generate, using the one or more computing devices, a ranking score for each of a plurality of passages from external documents, wherein the ranking score is based at least on a degree of semantic similarity of each passage with respect to a portion of the document; and modify, using the one or more computing devices, the document to include a footnote link for the portion of the document, the footnote link including a link to the external document having the highest ranked passage therein, if the ranking score of the highest ranked passage with respect to the portion of the document exceeds a threshold value, wherein the document is not modified to include the footnote link for the portion of the document if the ranking score of the highest ranked passage with respect to the portion of the document does not exceed a threshold value.

BRIEF DESCRIPTION OF THE DRAWINGS

The description herein makes reference to the accompanying drawings wherein like reference numerals refer to like parts throughout the several views, and wherein.

DETAILED DESCRIPTION

In order to verify statements of fact made in an online document, a reader might navigate to a search engine, formulate a search query, and then browse the results generated by the search engine. This solution is not ideal, because formulating a query at the right level of specificity is difficult, and the user may need to try multiple queries. In addition, finding relevant passages in the results returned by the search engine can be time consuming. The systems and methods described herein are directed to automatic footnote generation in online documents. Using the systems and methods described herein, some of the statements made in online documents are automatically annotated with links to relevant external documents that include passages that support or dispute the statement. In the systems and methods herein, statements in the document are compared to passages from external documents to determine a degree of semantic similarity between each statement and the passages from external documents. The statements can be annotated by adding links to one or more of the passages. In some implementations, a determination is made for each statement as to whether or not it should be annotated. In some implementations, ranking is applied to the passages from the external documents to determine which of the external documents should be referenced in a footnote link. The ranking applied to the passages can be based on, for example, semantic similarity, authoritativeness, and/or recency of the passages.

Figure 1:
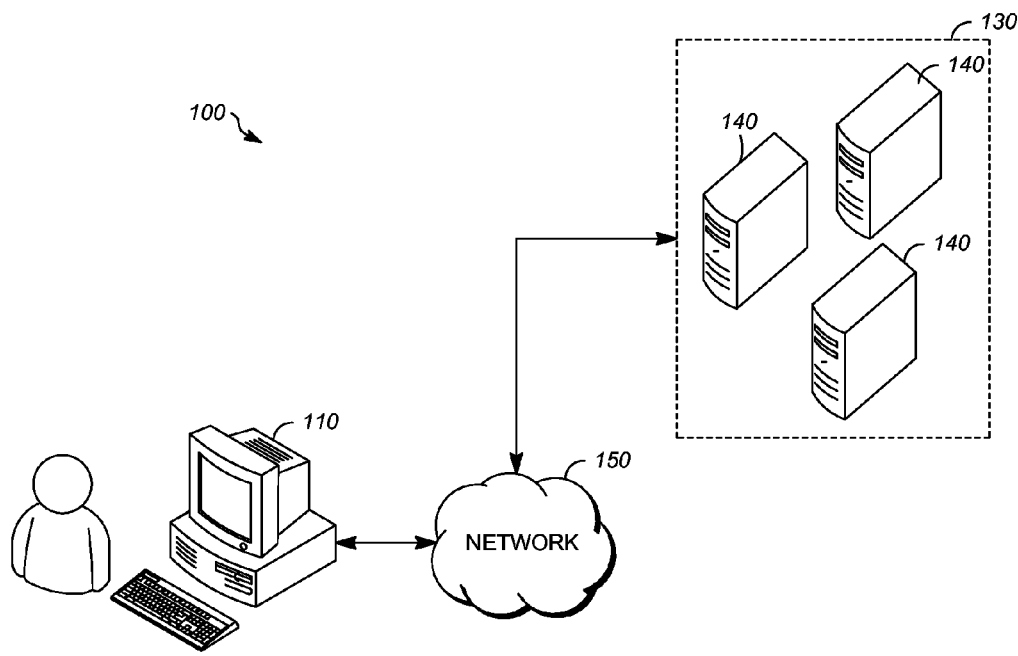
FIG. 1 is a block diagram showing an example of a system for automatic footnote generation.

FIG. 1 shows an example of an environment 100 in which a system for automatic footnote generation can be implemented. The environment 100 can include a user system 110 and an annotation system 130. The user system 110 is representative of a large number (e.g. millions) of user systems that can be included in the environment 100. The user system 110 can be any manner of computer or computing device, such as a desktop computer, a laptop computer, a tablet computer, or a smart-phone (a computationally-enabled mobile telephone). The annotation system 130 can be implemented using one or more server computers 140. The user system 110 and the annotation system 130 can each be implemented as a single system, multiple systems, distributed systems, or in any other form.

The systems, services, servers, and other computing devices described herein are in communication via a network 150. The network 150 can be one or more communications networks of any suitable type in any combination, including wireless networks, wired networks, local area networks, wide area networks, cellular data networks, and the internet.

The annotation system 130 provides an annotation service to the user system 110. In some implementations, all of the operations described herein with respect to automatically generating footnotes and annotating an online document are performed at the annotation system 130. In other implementations, some of the operations described herein are performed at the annotation system 130, and the other operations are performed at the user system 110.

Figure 2:
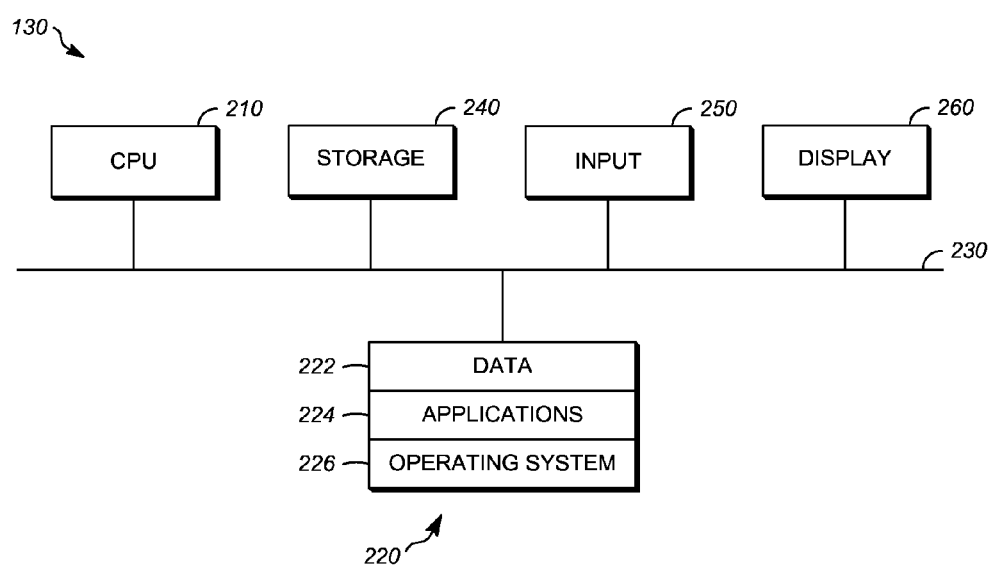
FIG. 2 is a block diagram showing an example of a server computer.

FIG. 2 is a block diagram of an example of a hardware configuration for the one or more server computers 140. The same hardware configuration or a similar hardware configuration can be used to implement the user system 110. Each server computer 140 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 2 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each server computer 140 can be composed of multiple buses. Further, the storage device 240 can be directly coupled to the other components of the respective server computer 140 or can be accessed via a network and can comprise a single integrated unit such as a memory card or multiple units such as multiple memory cards. The one or more server computers 140 can thus be implemented in a wide variety of configurations.

Figure 3:
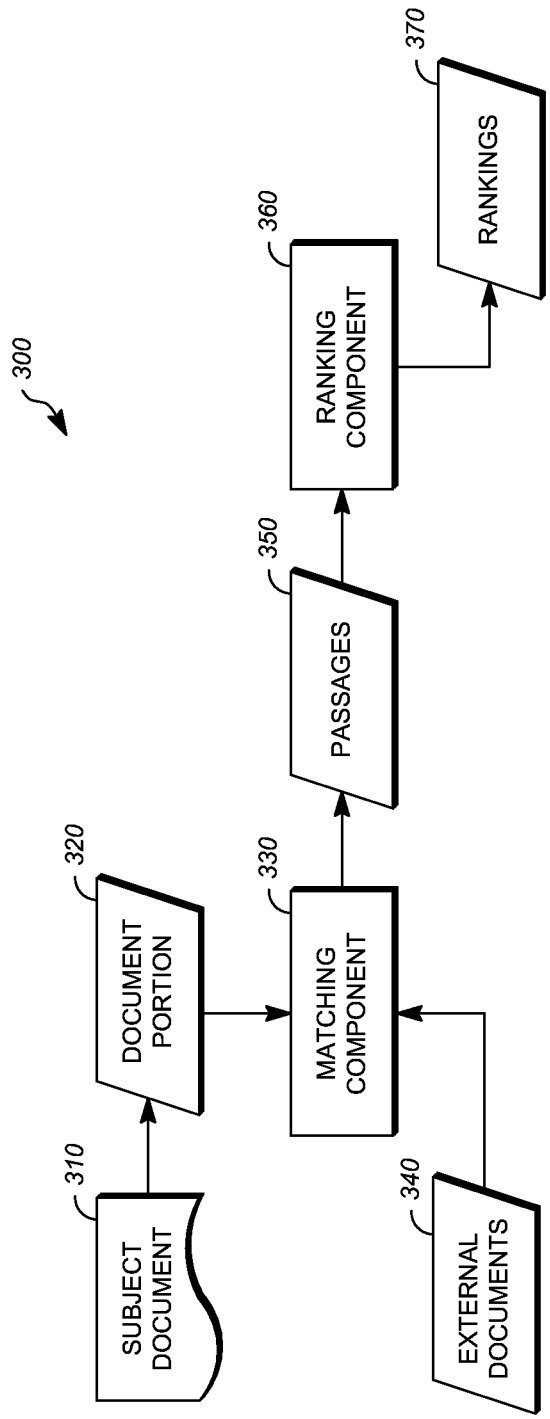
FIG. 3 is an illustration showing an example of identifying and ranking passages from external documents.

FIG. 3 is an illustration showing an example of an identifying and ranking operation 300. The identifying and ranking operation 300 can be performed, for example, by the one or more server computers 140 of the annotation system 130.

The identifying and ranking operation 300 is performed with respect to a subject document 310. The subject document 310 can be any type of document. As an example, the subject document 310 can be a webpage that is encoded in hypertext markup language (HTML). The subject document 310 can be accessed, for example, by the one or more server computers 140 of the annotation system 130. As one example, the one or more server computers 140 of the annotation system 130 can access the subject document 310 by receiving the subject document 310 from the user system 110. As another example, the one or more server computers 140 of the annotation system 130 can access the subject document 310 by receiving the subject document 310 from an external server computer via the network 310, which can be the internet. As another example, the one or more server computers 140 of the annotation system 130 can access the subject document 310 by receiving the subject document 310 from a storage device that is associated with the one or more server computers 140.

The subject document 310 can be divided into a plurality of document portions 320, each of which are subjected to the identifying and ranking operation 300. In one example, the document portions 320 are sentences. In this example, the subject document 310 can be divided into the document portions 320 by parsing the text contained within the subject document 310, identifying individual document portions 320 based on delimiters such as punctuation, and then storing the delimited portions of the subject document 310 as the document portions 320.

Each document portion 320 is received as an input at a matching component 330. As an example, the matching component 330 can be implemented in the form of software that is executed by the one or more server computers 140 of the annotation system 130. The matching component 330 is operable to access a repository of external documents 340 and identify a plurality of passages 350 from the external documents 340 that are relevant to the document portion 320. The matching component 330 identifies the passages 350 from the external documents 340 based on relevance or similarity of the passages 350 with respect to the document portion 320. In particular, the matching component 330 can implement a search function that is based on any of a variety of well-known search algorithms to identify the passages 350. As an example, the passages 350 can be identified using a subset of words from the document portion 320 as an input for a search function, or by using an entirety of the document portion 320 as an input for the search function.

In one implementation, the matching component 330 implements a semantic search algorithm that identifies the passages 350 based on semantic similarity between the document portion 320 and the passages 350. By way of example, the matching component 330 can incorporate or utilize a search engine that indexes the external documents 340 and assesses their relevance relative to the document portion 320. For each of the external documents 340 that the matching component 330 identifies as being relevant, the portions thereof that are relevant, such as by way of semantic similarity, to the document portion 320 are extracted as the passages 350. By way of example, the passages 350 can be one or more sentences or paragraphs from the external documents 340. In examples where the document portions 320 are sentences, semantic similarity can be assessed by comparing the entirety of the document portion 320 (i.e. the entirety of the sentence) to the passages 350.

The document portion 320 and the passages 350 are provided as inputs to a ranking component 360. The ranking component 360 generates a ranking score 370 for each of the passages 350. The ranking score 370 for each passage is based at least in part on semantic similarity of the document portion 320 and the respective one of the passages 350. For example, the ranking component 360 can assess semantic similarity by parsing each of the document portion 320 and the passages 350 to identify concepts conveyed in each, apply a numerical relatedness score to pairs of the concepts where each pair includes a concept from the document portion 320 and a concept from one of the passages 350, and subsequently generating a semantic relatedness score based on the scores assigned to concept pairs. Other algorithms can be utilized to determine semantic relatedness. The ranking scores 370 are based, at least in part, on the semantic relatedness score. In addition, the rankings 370 can be based on an authoritativeness rating for the external document 340 from which each passage 350 was extracted and/or an author related with the external documents 340. As an example, the authoritativeness rating can be calculated using an algorithm similar to the PageRank algorithm, as described in "The Anatomy of a Large-Scale Hypertextual Web Search Engine," by Sergey Brin and Lawrence Page, Computer Networks and ISDN Systems, 33: 107-17, 1998. The ranking score 370 can be further based on a recency score, such as one based on the time elapsed since of creation or modification of the respective one of the external documents 340 from which the passage 350 was extracted. In one example, the ranking score 370 can be computed as a weighted average of the semantic similarity score, the authoritativeness score, and the recency score.

Figure 4:
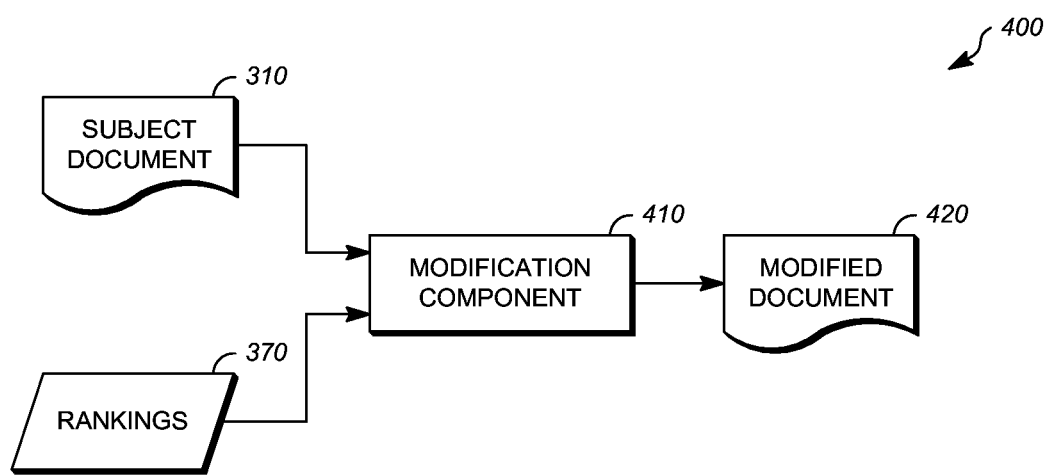
FIG. 4 is an illustration showing an example of modification of a subject document.

FIG. 4 is an illustration showing an example of a document modification operation 400. The document modification operation 400 can be performed, for example, by the one or more server computers 140 of the annotation system 130.

In the document modification operation 400, the subject document 310 and the ranking scores 370 are provided as inputs to a modification component 410. For each document portion 320 of the subject document 310, the modification component 410 makes a determination as to whether to annotate the respective document portion 320 of the subject document 310 by insertion of a footnote link for the document portion 320.

In one implementation, the modification component 310 modifies each document portion 320 of the subject document 310 to include a footnote link to the highest ranked passage 350 from the external documents 340 based on the rankings 370.

In another implementation, the modification component accesses the ranking score 370 for the highest ranked passage 350 from the external documents 340. The modification component 410 compares the ranking score 370 for the highest ranked one of the passages 350 to a threshold value. If the ranking score 370 exceeds the threshold value, the subject document 310 is modified to include a footnote link for the document portion 320. For example, in an HTML document, a hyperlink can be inserted within or adjacent to the document portion 320, where the hyperlink references a URL corresponding to the external document 340 in which the passage 350 can be found. As another example, the footnote link can include a pop-up interface element that is displayed within the context of the document and shows the passage 350 while giving the user the option to navigate to the external document 340 in which the passage 350 can be found. For example, in an HTML document, this can be done by modifying the HTML document and including code portions therein that cause display of the interactive pop-up element, such as JavaScript code. The foregoing implementations are given as examples, and it should be understood that other types of footnote links can be implemented. If the ranking score 370 for the highest ranked one of the passages 350 does not exceed the threshold value, the subject document 310 is not modified to include the footnote link for the document portion 320.

In some implementations, the document modification operation is performed at the one or more server computers 140 of the annotation service 130. In such an implementation, a copy of a subject document 310 is made at the annotation service 130. A subject document 310 is modified at the annotation service 130, and a modified document 420 is transmitted from the annotation service 130 to the user system 110.

In other implementations, the document modification operation 400 is performed at the user system 110. As an example, the document modification operation 400 can be implemented by software that is executed at the user system 110, such as by way of a plug-in for a web browser software program. In one implementation, the subject document 310 can be received at the user system 110, the rankings 370 are received by a transmission of the ranking scores 370 from the one or more server computers 140 of the annotation service 130, and the modification component 410 is executed at the user system 110 with respect to a copy of the subject document 310 that is present at the user system 110 to produce the modified document 420 at the user system 110. In another implementation, the subject document 310 can be received at the user system 110, the rankings 370 are utilized by the one or more server computers 140 of the annotation service 130 to generate information describing one or more document modifications, and the information describing the one or more document modification operations is transmitted to the user system 110. The information describing the one or more document modification operations, when executed by the modification component 410 at the user system 110, causes the user system 110 to annotate the subject document 310 to produce the modified document 420.

Figure 5:
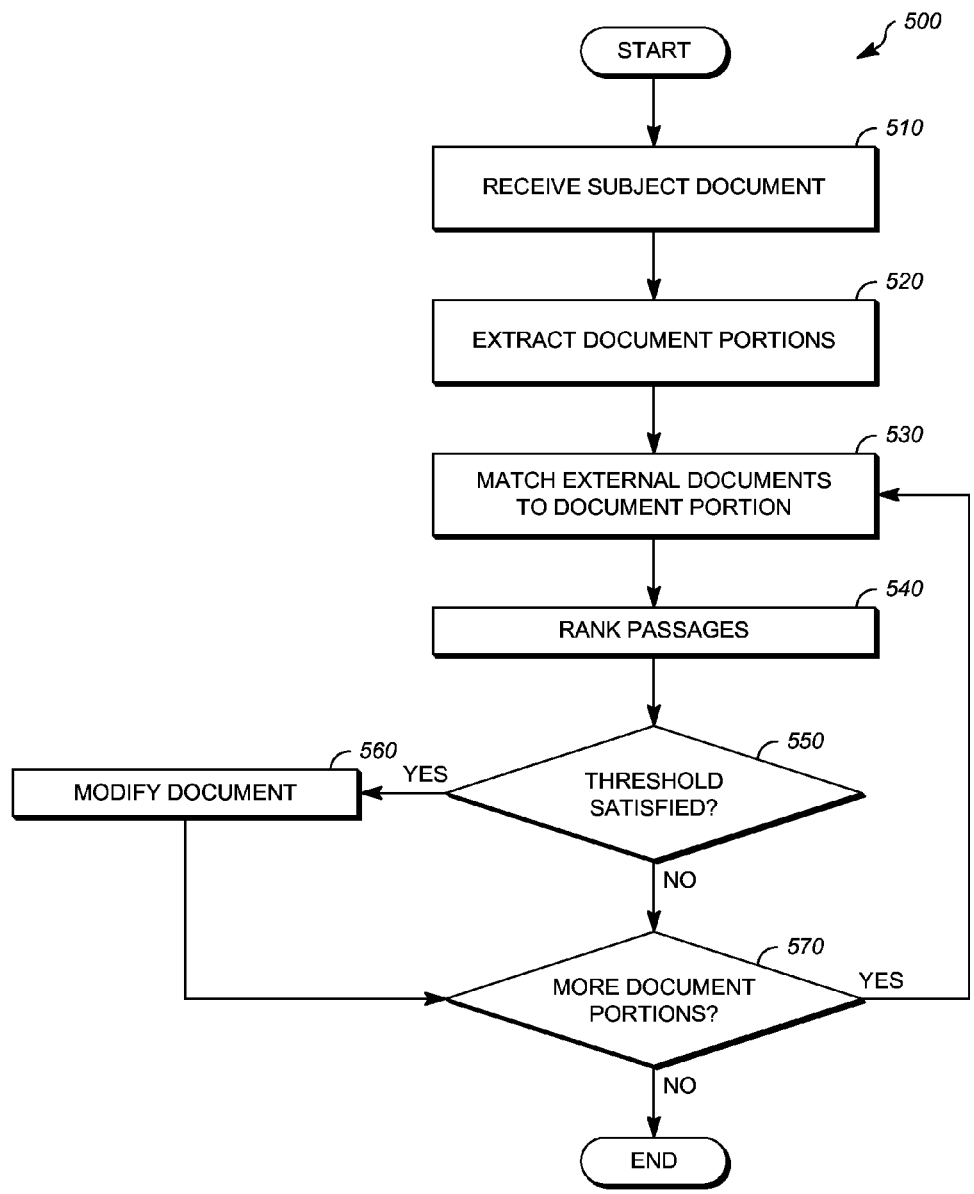
FIG. 5 is a flow chart showing an example of a process for automatic footnote generation.

FIG. 5 is a flow chart showing a process 500 for automatic footnote generation. The operations described in connection with the process 500 can be performed at one or more computers, such as at the one or more server computers 140 of the annotation system 130. As used herein, the phrases "one or more computers," "one or more computing devices," "one or more server computers," and similar phrases include all of the computers or groups of computers that participate in performing the process. For example, the process 500 can be performed at one or more computers in an implementation where each of the operations described herein is performed using a different group of computers, where each group of computers cooperatively performs the respective operation of the process. When an operation is performed by one or more computers, it is completed when it is performed by one computer. The operations described in connection with the first example process 500 can be embodied as a non-transitory computer readable storage medium including program instructions executable by one or more processors that, when executed, cause the one or more processors to perform the operations. For example, the operations described in connection with the first example process 500 could be stored at the memory 220 of a respective one of the server computers 140 and be executable by the CPU 210 thereof.

At operation 510, a subject document is received. As an example, the subject document 310 can be received at the one or more server computers 140 of the annotation service 130.

At operation 520, document portions are extracted from the subject document. As an example, the document portions 320 can be extracted from the subject document 310 by operations such as text parsing. In some implementations, the document portions 320 are sentences that can be extracted by analysis of the text contained within the subject document 310 including delimiters such as punctuation.

At operation 530, external documents are matched to the document portion. As previously explained, external documents can be matched to the document portion based on relevance, such as a degree of semantic similarity between the external documents and the document portion. By way of example, the matching component 330 can match the external documents 340 to the document portion 320 to identify relevant passages 350 from the external documents 340 as previously described.

At operation 540, the passages from the documents identified at operation 530 are ranked. As an example, a ranking component 360 can rank the passages 350 based on multiple factors including at least a degree of semantic similarity between the document portion 320 and the passages 350, as previously described with respect to the ranking component 360. As previously discussed, the output of operation 540 can be the ranking scores 370 for the passages 350.

At operation 550, a determination is made as to whether a threshold is satisfied by the rankings for the passages, as ranked in operation 540. For example, the ranking scores 370 that were generated by the ranking component 360 can be compared to a threshold as discussed in connection with the modification component 410. If the threshold is satisfied, the process continues to operation 560 where the document is modified to include a footnote link. This can be performed in the manner discussed in connection with the modification component 410, for example, by inserting the footnote link into a copy of the subject document 310 to generate the modified document 420.

Subsequent to modification of the document at operation 560 or if the threshold was not satisfied at operation 550, the process continues to operation 570. At operation 570, a determination is made as to whether more document portions are contained within the subject document 310 with respect to which the automated annotation process has not yet been performed. If more document portions exist for analysis, the process returns to operation 530. If all of the document portions have been analyzed, the process ends.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
   accessing, at one or more computing devices, a document;
   identifying a plurality of sentences of the document, each sentence identified based on punctuation in the document; and
   executing, for each of the sentences of the document and using the one or more computing devices, a document modification operation that includes:
   generating a ranking score for each of a plurality of passages from external documents, wherein the ranking score is based at least on a degree of semantic similarity of each of the plurality of passages from the external documents with respect to the sentence of the document,
   modifying the sentence to include a footnote link for the sentence in the document, the footnote link including a link to the external document having a highest ranked passage therein if the ranking score of the highest ranked passage with respect to the sentence exceeds a threshold value, and
   skipping modification of the sentence if the ranking score of the highest ranked passage with respect to the sentence does not exceed the threshold value.

2. The method of claim 1, wherein the degree of semantic similarity of each of the plurality of passages from the external documents with respect to the sentence of the document is based on the entirety of the sentence.

3. The method of claim 1, wherein the ranking score each of the plurality of passages from external documents is based further on an authoritativeness rating for each of the external documents.

4. The method of claim 1, wherein the plurality of passages from external documents are identified using a subset of words from the sentence of the document as an input for a search function.

5. The method of claim 1, wherein the one or more computing devices include a server computing device and a client computing device, generating the ranking score for each of a plurality of passages from external documents is performed at the client computing device based on data received from the server computing device, and modifying the sentence to include the footnote link is performed at the client computing device.

6. The method of claim 1, wherein the one or more computing devices include a server computing device and a client computing device, generating the ranking score for each of a plurality of passages from external documents is performed at the server computing device, modifying the sentence to include the footnote link is performed at the server computing device, and a modified document is transmitted from the server computing device to the client computing device.

7. The method of claim 1, wherein modifying the sentence to include the footnote link further includes generating a pop-up interface element for the sentence in the document, the pop-up interface element displaying the highest ranked passage therein if the ranking score of the highest ranked passage with respect to the sentence exceeds the threshold value.

8. A hardware computer-readable storage medium including program instructions executable by one or more processors that, when executed, cause the one or more processors to perform operations, the operations comprising:
   accessing, at one or more computing devices, a document;
   identifying a plurality of sentences of the document, each sentence identified based on punctuation in the document; and
   executing, for each of the sentences of the document and using the one or more computing devices, a document modification operation that includes:
   generating a ranking score for each of a plurality of passages from external documents, wherein the ranking score is based at least on a degree of semantic similarity of each of the plurality of passages from the external documents with respect to the sentence of the document,
   modifying the sentence to include a footnote link for the sentence in the document, the footnote link including a link to the external document having a highest ranked passage therein if the ranking score of the highest ranked passage with respect to the sentence exceeds a threshold value, and skipping modification of the sentence if the ranking score of the highest ranked passage with respect to the sentence does not exceed the threshold value.

9. The hardware computer-readable storage medium of claim 8, wherein the degree of semantic similarity of each of the plurality of passages from the external documents with respect to the sentence of the document is based on the entirety of the sentence.

10. The hardware computer-readable storage medium of claim 8, wherein the ranking score each of the plurality of passages from external documents is based further on an authoritativeness rating for each of the external documents.

11. The hardware computer-readable storage medium of claim 8, wherein the plurality of passages from external documents are identified using a subset of words from the sentence of the document as an input for a search function.

12. The hardware computer-readable storage medium of claim 8, wherein the one or more computing devices include a server computing device and a client computing device, generating the ranking score for each of a plurality of passages from external documents is performed at the client computing device based on data received from the server computing device, and modifying the sentence to include the footnote link is performed at the client computing device.

13. The hardware computer-readable storage medium of claim 8, wherein the one or more computing devices include a server computing device and a client computing device, generating the ranking score for each of a plurality of passages from external documents is performed at the server computing device, modifying the sentence to include the footnote link is performed at the server computing device, and a modified document is transmitted from the server computing device to the client computing device.

14. The hardware computer-readable storage medium of claim 8, wherein modifying the sentence to include the footnote link further includes generating a pop-up interface element for the sentence in the document, the pop-up interface element displaying the highest ranked passage therein if the ranking score of the highest ranked passage with respect to the sentence in exceeds the threshold value.

15. An apparatus, comprising:
one or more processors; and
one or more memory devices for storing program instructions used by the one or more processors, wherein the program instructions, when executed by the one or more processors, cause the one or more processors to:
access, at one or more computing devices, a document,
identify a plurality of sentences in the document, each sentence identified based on punctuation in the document; and
execute, for each of the sentences of the document and using the one or more computing devices, a document modification operation that causes the one or more processors to:
generate a ranking score for each of a plurality of passages from external documents, wherein the ranking score is based at least on a degree of semantic similarity of each of the plurality of passages from the external documents with respect to the sentence of the document,
modify the sentence to include a footnote link for the sentence-in the document, the footnote link including a link to the external document having a highest ranked passage therein if the ranking score of the highest ranked passage with respect to the sentence exceeds a threshold value, and
skip modification of the sentence if the ranking score of the highest ranked passage with respect to the sentence does not exceed the threshold value.

16. The apparatus of claim 15 wherein the degree of semantic similarity of each of the plurality of passages from the external documents with respect to the sentence of the document is based on the entirety of the sentence.

17. The apparatus of claim 15, wherein the ranking score each of the plurality of passages from external documents is based further on an authoritativeness rating for each of the external documents.

18. The apparatus of claim 15, wherein the plurality of passages from external documents are identified using a subset of words from the sentence of the document as an input for a search function.

19. The apparatus of claim 15, wherein the one or more computing devices include a server computing device and a client computing device, generating the ranking score for each of a plurality of passages from external documents is performed at the client computing device based on data received from the server computing device, and modifying the sentence to include the footnote link is performed at the client computing device.

20. The apparatus of claim 15, wherein the one or more computing devices include a server computing device and a client computing device, generating the ranking score for each of a plurality of passages from external documents is performed at the server computing device, modifying the sentence to include the footnote link is performed at the server computing device, and a modified document is transmitted from the server computing device to the client computing device.

21. The apparatus of claim 15, wherein modifying the sentence to include the footnote link further includes generating a pop-up interface element for the sentence in the document, the pop-up interface element displaying the highest ranked passage therein if the ranking score of the highest ranked passage with respect to the sentence exceeds the threshold value.

* * * * *